United States Patent [19]
Miyamori et al.

[11] Patent Number: 5,825,462
[45] Date of Patent: Oct. 20, 1998

[54] FILM CARTRIDGE STORAGE APPARATUS

[75] Inventors: Takahisa Miyamori; Yoshiyuki Yamaji; Toru Yoshikawa, all of Wakayama, Japan

[73] Assignee: Noritsu Koki Co., Ltd., Wakayama-ken, Japan

[21] Appl. No.: 569,790

[22] Filed: Dec. 8, 1995

[30] Foreign Application Priority Data

Dec. 13, 1994 [JP] Japan ..................................... 6-309065
Oct. 25, 1995 [JP] Japan ..................................... 7-277795

[51] Int. Cl.⁶ .......................... G03B 27/00; G03B 27/62; G03D 17/00
[52] U.S. Cl. ................................ 355/75; 355/27; 355/29; 396/647
[58] Field of Search ..................................... 396/612, 623, 396/624, 647, 648; 355/27–29, 40, 41, 38, 50, 75; G03B 27/00, 27/62; G03D 17/00

[56] References Cited

U.S. PATENT DOCUMENTS

| | | | |
|---|---|---|---|
| 4,926,211 | 5/1990 | Ozawa | 355/28 |
| 5,229,802 | 7/1993 | Shiota et al. | 354/275 |
| 5,231,439 | 7/1993 | Takahashi et al. | 354/313 |
| 5,311,237 | 5/1994 | Kawada et al. | 354/341 |
| 5,347,338 | 9/1994 | Weibel | 354/340 |

FOREIGN PATENT DOCUMENTS 0469594  2/1992  European Pat. Off. .

*Primary Examiner*—R. L. Moses
*Assistant Examiner*—Shival Virmani
*Attorney, Agent, or Firm*—Felfe & Lynch

[57] ABSTRACT

A film cartridge storage apparatus for storing a plurality of film cartridges 20 stacked one on another. The stored film cartridges 20 are extracted from the apparatus one after another from the lowermost cartridge in association with a pivotal member 83 of an individual feed mechanism 80; 18; 280 having a first arm portion 83a and a second arm portion 83b. The first arm portion 83a of the pivotal member 83 pivots between a first area and a second area to hold the lowermost film cartridge in the first area and also to feed the lowermost film cartridge in the second area. The second arm portion 83b of the pivotal member allows a film cartridge to fall toward the first arm portion in the first area and also prevents a film cartridge from falling toward the first arm portion in the second area. An elastic escape means 90; 190; 290 is provided for avoiding mutual interference between a film cartridge contacting the second arm portion and a pivotal locus of the second arm portion in the course of the pivotal movement of the second arm portion from the first area to the second area.

18 Claims, 18 Drawing Sheets

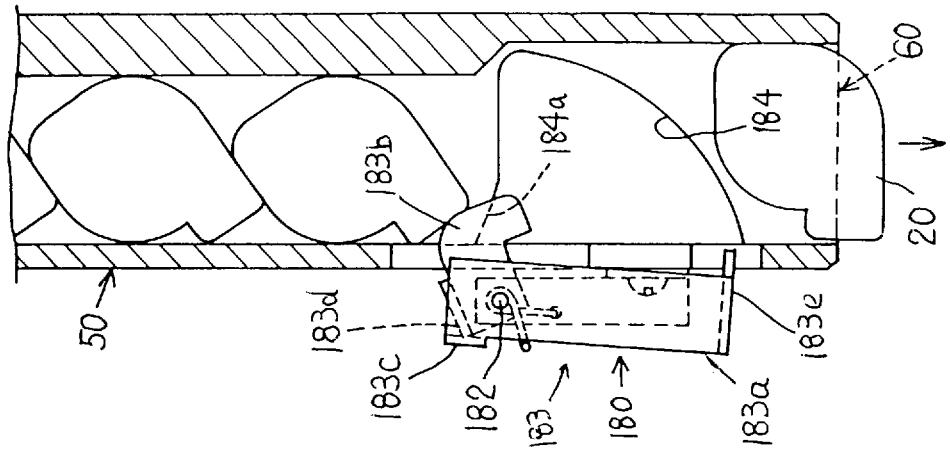
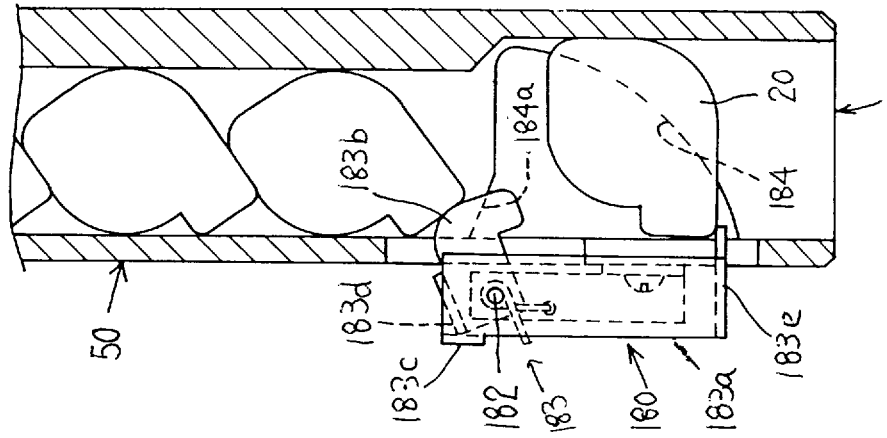
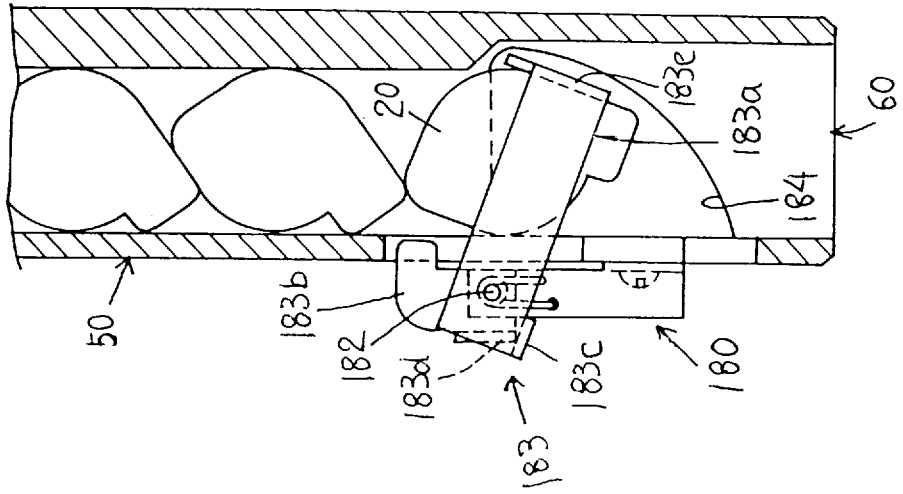

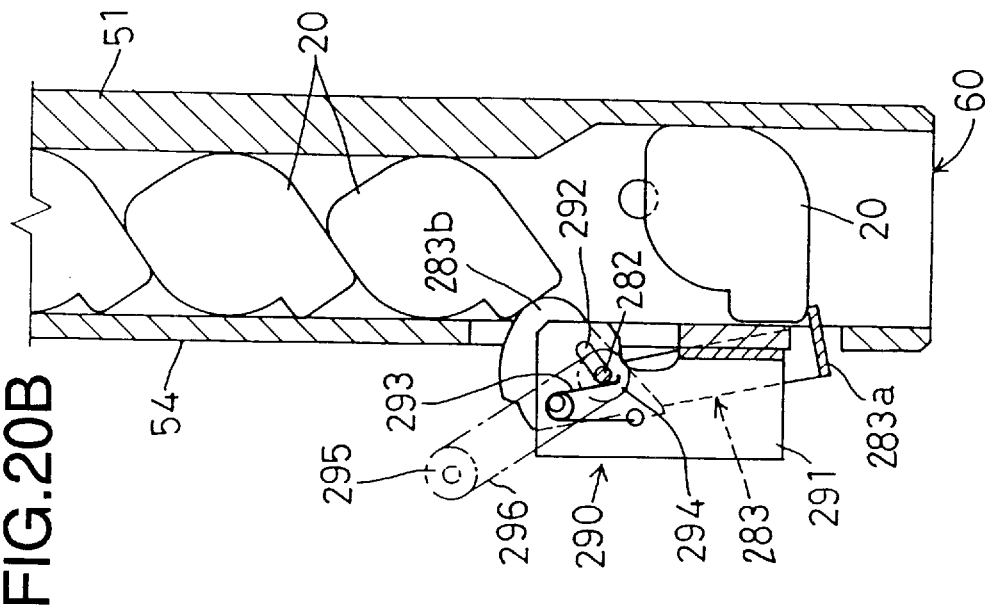
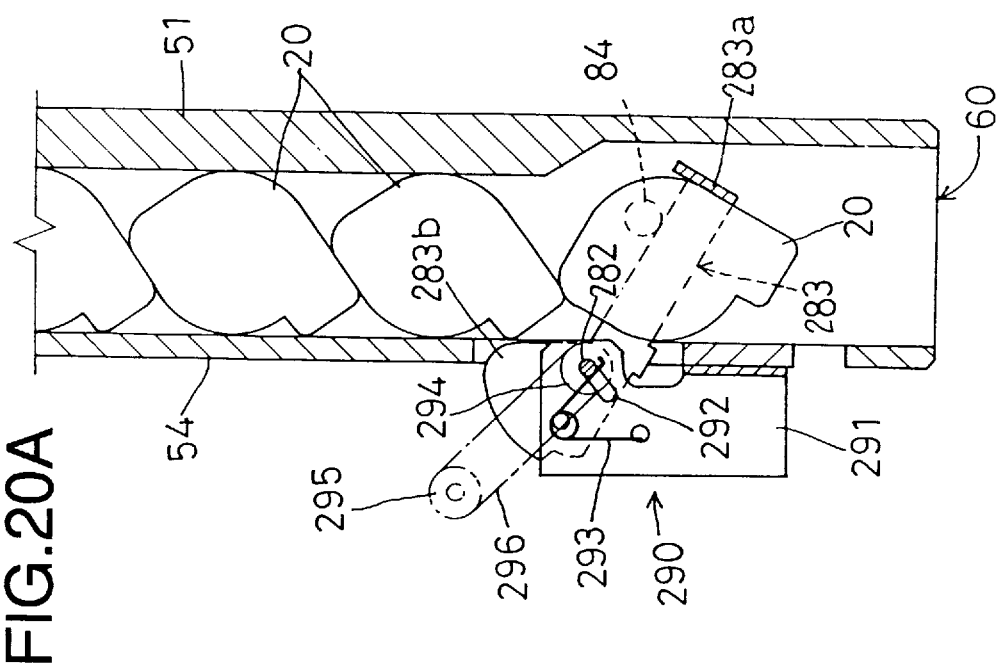

FILM CARTRIDGE STORAGE APPARATUS

BACKGROUND OF THE INVENTION

1. Field of the Invention

The present invention relates to a film cartridge storage apparatus for storing a plurality of film cartridges and feeding these cartridges one after another.

2. Description of the Related Art

A film cartridge storage apparatus of the above-noted type is generally used in a variety of photographic processing systems such as a photographic printer or a film processor. The storage apparatus is adapted for feeding the stored film cartridges to be processed one after another while maintaining each cartridge as fed under a predetermined posture, thus contributing to general automatization of the system operation.

In a film cartridge storage apparatus of one known type, the apparatus comprises a rotary drum-like rotary case whose periphery defines a plurality of recesses, as film cartridge holding portions, formed by inner walls each configured so as to fit the contour of the film cartridge to be held therein. In operation, with rotation of the drum, the film cartridges held within the holder portions are fed one after another. In an apparatus of another known type, the apparatus comprises an endless belt having a plurality of recesses, as film cartridge holding portions, formed by inner walls configured to fit the contour of the film cartridge. With rotation of the endless belt, the cartridges are taken out one after another from the film holding portions.

With the above known constructions, however, for increasing the storage capacity, this requires enlargement of the diameter of the rotary drum or elongation of the endless belt, whereby the entire apparatus will disadvantageously occupy a larger installment space in the system.

SUMMARY OF THE INVENTION

An object of the present invention is to provide a film storage apparatus which allows efficient utilization of the space to be occupied by its film cartridge storing case section.

Another object of the invention is to provide an apparatus which allows film cartridges stored in the apparatus to be fed one by one in a smooth and unobtructed manner.

For accomplishing the above-noted objects, a film cartridge storage apparatus, according to the present invention, comprises: a storage case for stacking a plurality of film cartridges in a row; an inlet section including an inlet opening configured to introduce the film cartridges into the storage case with maintaining each cartridge under a predetermined posture; and an outlet section provided at a lower portion of the storage case for exiting the film cartridges stored within the storage case while maintaining the cartridge at a predetermined posture.

According to the above-described construction, the film cartridges introduced into the storage case are stacked one on another with being maintained at the predetermined posture by means of the configuration of the inlet opening in such a manner as to leave no space between adjacently stacked cartridges. Thus, the space of the storage case may be utilized efficiently.

According to one preferred embodiment of the invention, the inlet section includes a guide portion for temporarily holding the film cartridge introduced from the inlet opening. Hence, the film cartridge may be settled within the storage case with the cartridge being maintained at the predetermined posture more reliably.

According to a further embodiment of the invention, the film cartridge held by the guide portion is accessible from the outside through an opening (e.g. by pushing the cartridge with a finger from the outisde through the opening) to be released from the guide portion. Alternatively, the release of the film cartridge from the guide portion can be realized by retracting the guide portion from the cartridge by a mechanism which is known per se.

According to a still further embodiment of the invention, the film cartridge storage apparatus further comprises an individual feed mechanism disposed adjacent the outlet section for feeding one by one the film cartridges stored at the storage case. This individual feed mechanism includes a movable member movable between a first area and a second area. The movable member includes a first arm portion and a second arm portion. The first arm portion is adapted to hold a lowermost film cartridge at the first area and also to release and feed the lowermost film cartridge to the outlet section at the second area. The second arm portion is adapted to allow a film cartridge to be dropped toward the first arm portion at the first area and also to prevent the film cartridge from being dropped toward the first arm portion at the second area. With this construction, the film cartridges are fed one after another as being alternatively received by the first arm portion and the second arm portion.

Incidentally, in order to avoid inadvertent change in the posture of the film cartridges within the storage case, this storage case has a substantially square cross section, one side of the square corresponding in length to an axial length of the film cartridge contour, the other, i.e. adjacent side of the square corresponding in length to a minimum radial length of the film cartridge contour. On the other hand, in the movable range of the individual feed mechanism, or more precisely, in the movable ranges of the first and second arm portions of this mechanism, a certain amount of space is required for allowing some amount of change in the posture of the film cartridge. Therefore, in this range or area, the film passage has an enlarged cross section in the radial direction of the film cartridge relative to the above-mentioned cross section of the storage case.

According to a still further embodiment of the invention, the movable member of the individual feed mechanism described supra comprises a pivotal member pivotable between the first area and the second area. Then, with a single pivotal operation, the first arm portion may be moved into the film cartridge passage and the second arm portion may be moved out of the film cartridge passage simultaneously. Hence, this can simplify the operations of the individual feed mechanism.

With the individual feed mechanism having the above-described construction, there is possibility of mutual obstruction or jamming between the adjacent film cartridges which are stacked one on the other thereby to disable the feeding pivot arm of the individual feed mechanism. In order to avoid such problem, according to a further embodiment of the invention, the apparatus further comprises an elastic escape means for preventing mutual interference between a film cartridge contacting the second arm portion and a pivotal locus of the second arm portion. With this construction, when the pivotal member is pivoted to the second area for feeding the lowermost film cartridge and if jamming is about to occur between the second arm portion and the stacked film cartridge, the elastic escape means eliminates mutual interference between the film cartridge contacting the second arm portion and the pivotal locus of the second arm portion. As a result, the second arm portion, or consequently, the first arm portion may be pivoted smoothly to release the lowermost film cartridge to be fed to the outlet section.

According to a still further embodiment of the invention, the elastic escape means comprises a cartridge escape mechanism for elastically moving the film cartridge contacting the second arm portion out of the pivotal locus of the second arm portion. In this case, when the stacked film cartridge is subjected to a force in association with the pivotal movement of the second arm portion, the cartridge escape means elastically urges this film cartridge away from the pivotal locus of the second arm portion.

One preferred construction of this cartridge escape mechanism is a member which is formed at least at a portion of a wall member constituting the storage case and which is capable of being elastically deformed to the outside. With this, when the stacked film cartridge is subjected to a force in association with the pivotal movement of the second arm portion, the deformable member is elastically deformed to the outside, thus extending the inner space of the storage case, so that the film cartridge may escape into this extended space to allow smooth pivotal movement of the second arm portion.

One simple specific construction of such deformable member is a tongue element formed by cutting the wall member of the storage case while leaving proximal end of the element un-cut from the wall member. The un-cut proximal end functions as an elastic hinge of the tongue element. If the material of the wall member of the storage case is not suitable as the elastic hinge or if a more reliable hinge is desired, the deformable member may comprise a pivotal lid spring-biased so as to close an opening defined in the wall member of the storage case. In this case, with appropriate selection of the spring force for biasing the pivotal lid, the cartridge escape mechanism may be provided with a desired deformation tendency.

According to a still further embodiment of the invention, the elastic escape means comprises an arm escape mechanism for allowing the second arm portion to be moved in a direction away from the film cartridge contacting this second arm portion. In this case, when the second arm portion and a film cartridge become stuck to each other, since the second arm portion per se allows escape, the pivot member too is allowed to pivot. No special treatment will be needed on the part of the storage case for providing this function.

On typical construction of the above-described arm escape mechanism is a flange for pivotably connecting a pivotal shaft of the pivotal member to the storage case via a spring. Namely, the pivotal shaft of the pivotal member is supported by means of the spring in such a manner that the shaft can be moved away from the film cartridge contacting the same. This construction provides a by-effect that the mechanism achieves its intended function also when the first arm portion rather than the second arm portion becomes interfered with by some obstruction.

According to a still further embodiment of the invention, the pivotal member is coupled with a drive motor through a gear transmission mechanism including a drive gear and a driven gear. Either the drive gear or the driven gear has an operative region and an inoperative region provided in a regular distribution pattern. The pivotal movement of the pivotal member from the first area to the second area is effected by means of the drive motor; whereas, the return pivotal movement of the pivotal member from the second area to the first area is effected by means of a spring force by utilizing the inoperative region. In this case, although the pivotal member is pivoted back and forth, the drive motor may be driven intermittently only in the forward rotation direction. And, the return pivotal movement may be effected quickly by means of the spring force appropriately selected for this purpose.

Further and other objects, features and effects of the invention will become more apparent from the following more detailed description of the embodiments of the invention with reference to the accompanying drawings.

BRIEF DESCRIPTION OF THE DRAWINGS

FIGS. 12A, 12B and 12C are descriptive views illustrating the functions of a modified individual feed mechanism, FIGS. 20A and 20B are schematic descriptive views illustrating functions of an arm escape mechanism.

DESCRIPTION OF THE PREFERRED EMBODIMENTS

Preferred embodiments of a film cartridge storage apparatus relating to the present invention as applied in a photographic printing system will be described in detail with reference to the accompanying drawings.

Figure 1:
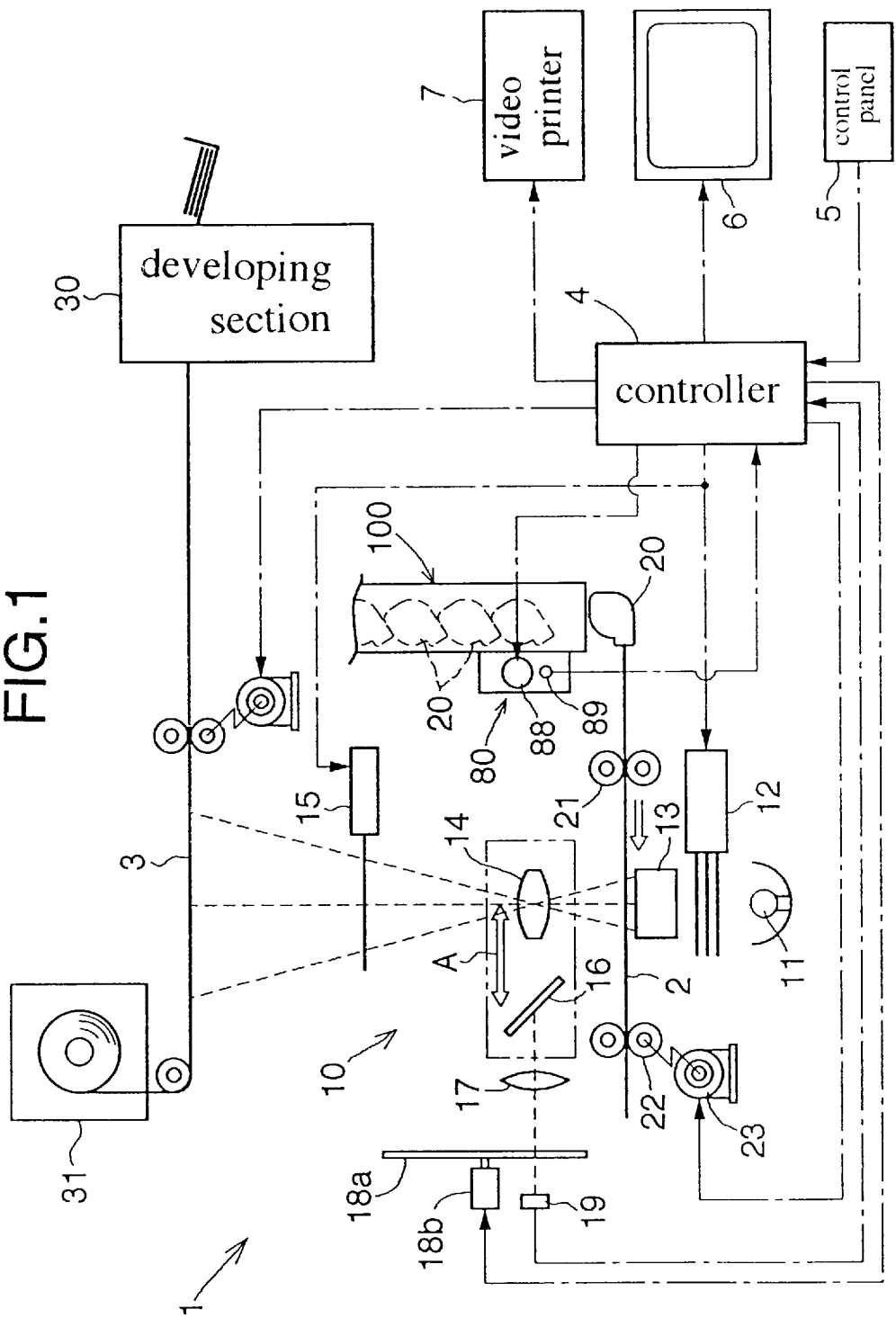
FIG. 1 is a schematic construction view of a photographic printing system to which a film cartridge storage apparatus relating to the present invention is applied.

As shown in FIG. 1, a photographic printing system 1 includes a projection exposure unit 10 for projecting and exposing image information of a film 2 on to a print paper 3, a developing section 10 for developing the print paper 3 exposed at the projection exposure section 10, and a controller 4 for effecting control operations of the various components of this photographic printing system 1. The controller 4 is connected with a control panel 5 for effecting a variety of instruction inputs and mode settings, a monitor 6 for displaying image information and a video printer 7 for use in making a so-called index print which comprises a single print paper printed thereon with a plurality of images.

The print paper 3 withdrawn from a print paper magazine 31 in which the print paper 3 has been stored in a rolled state is exposed at the projection exposure unit 10, developed at the developing unit 30 and then cut into a sheet containing one frame amount of image information to be discharged from the system.

Next, the respective components of the system will be described.

The projection exposure unit 10 includes a light source 11, a light modulating filter 12 for adjusting color balance of the light to be irradiated on to the film 2, a mirror tunnel 13 for uniformly mixing the color components of the light past the light modulating filter 12, a printing lens 14 for focusing the image of the film 2 on the print paper 3, and a shutter 14. These components are aligned along a common optical axis constituting an exposure light path.

Adjacent the printing lens 14, there is provided a scanner means for scanning image information of the film 2. This scanner means includes a reflecting mirror 16, a lens 17, a rotary color filter 18a including along its periphery R (red), G (green) and B (blue) color filters, a motor 18b for rotatably driving the rotary color filter 18a, and a CCD image sensor 19. The operations of the components including the motor 18b and the image sensor 19 are all controlled by the controller 4.

The reflecting mirror 16 and the printing lens 14 are mounted together on an unillustrated movable mount.

Then, as the movable mount mounting the printing mirror 14 and the reflecting mirror 16 thereon is moved in a direction of an arrow A in FIG. 1, there is selectively realized either a condition in which the printing lens 14 is positioned on the exposure light path or another condition in which the reflecting mirror 16 is positioned on the exposure light path.

In the former condition in which the printing lens 14 is positioned on the exposure light path, the printing lens 14 forms image information of the film 2 on the print paper 3. Whereas, in the latter condition in which the reflecting mirror 16 is positioned on the exposure light path, the image information of the film 2 is reflected by the reflecting mirror 16 and then is formed by the lens 17 on a light receiving surface of the CCD image sensor 19.

The CCD image sensor 19 detects the image information of the film 2 as being separated into the R, G and B color components in association with rotation of the rotary color filter 18a, and the detected image information is then transmitted to the controller 4.

A roller 21 is disposed on an upstream side in a film transport passage, and a further roller 22 is disposed on a downstream side in the film transport passage. The rollers 21, 22 are driven by a motor 23 in correlation with each other to transport the film 2.

Figure 2:
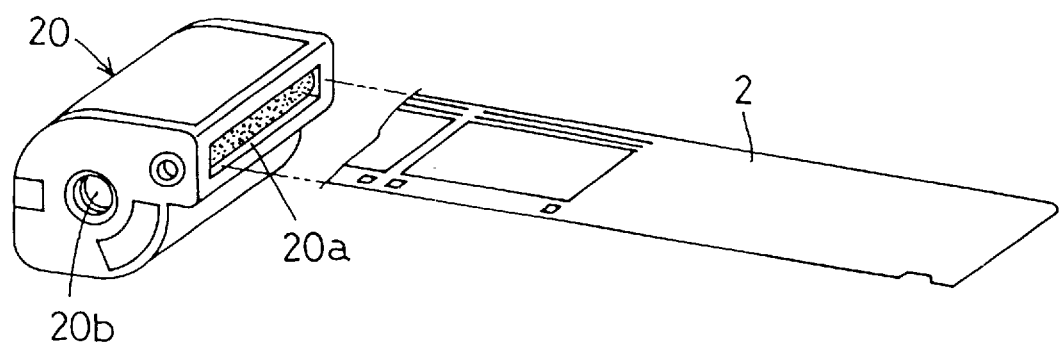
FIG. 2 is a descriptive view of a film cartridge.

On the upstream of the roller 21 in the film transport passage, there is detachably provided a film cartridge storage apparatus 100 capable of storing a plurality of film cartridges 20 one of which is shown in FIG. 2.

Figure 3:
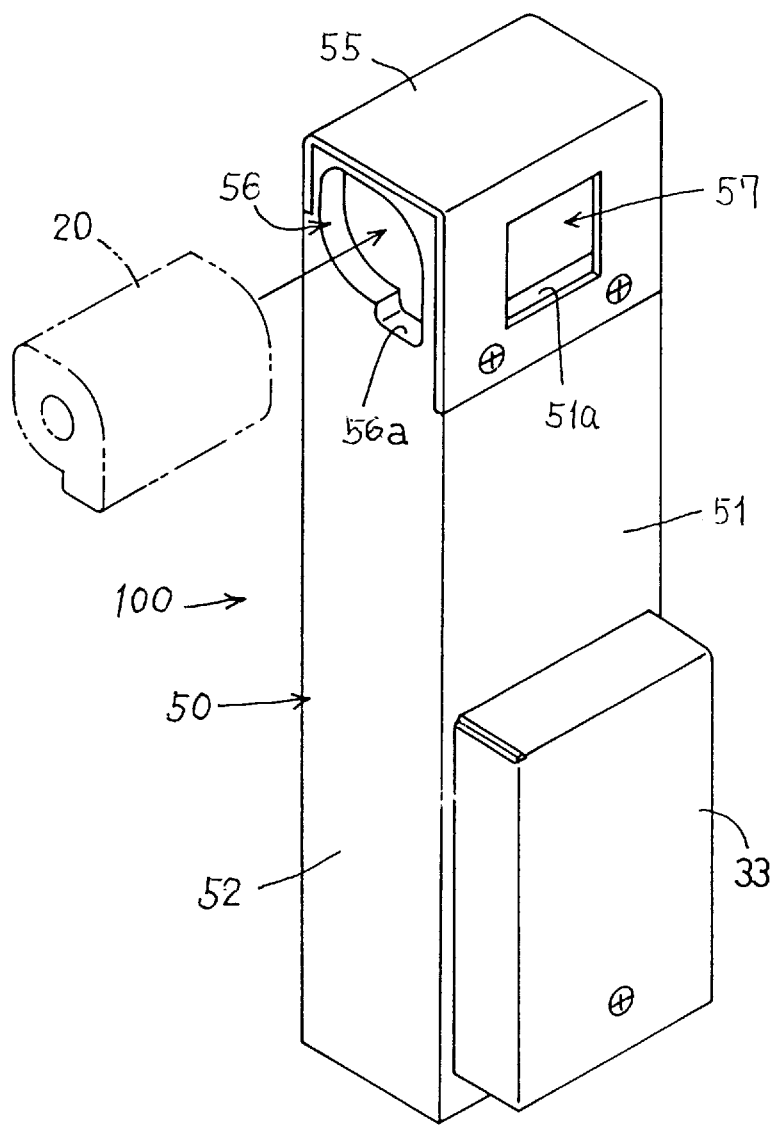
FIG. 3 is a perspective view showing one preferred embodiment of the film cartridge storage apparatus relating to the invention.
Figure 4:
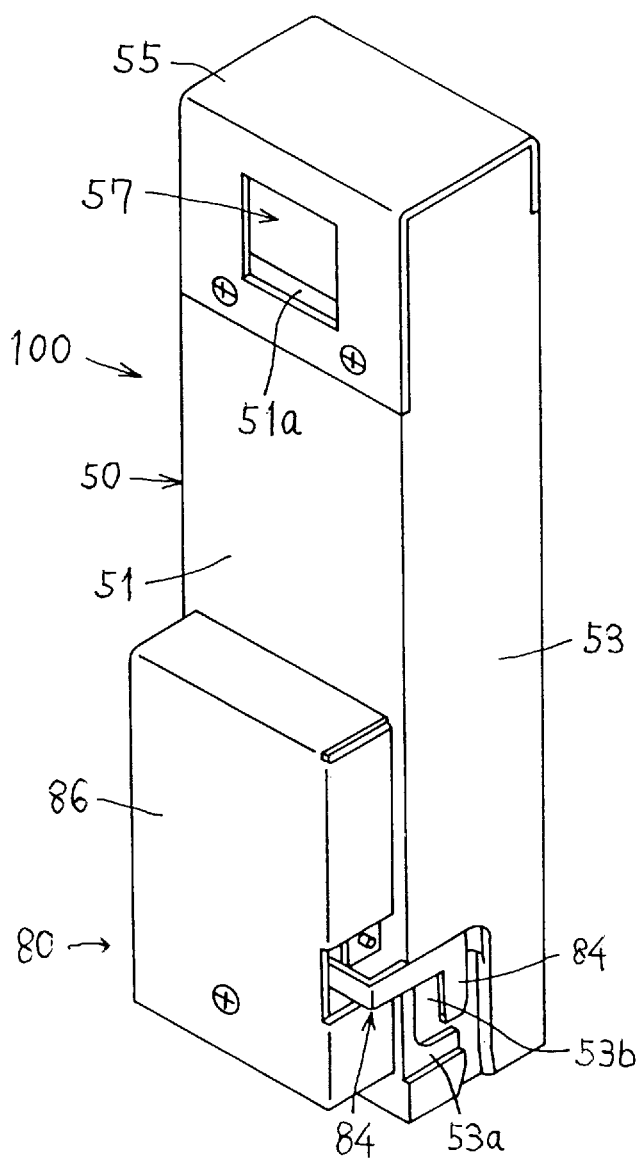
FIG. 4 is a perspective view of the film cartridge storage apparatus of FIG. 3.
Figure 5:
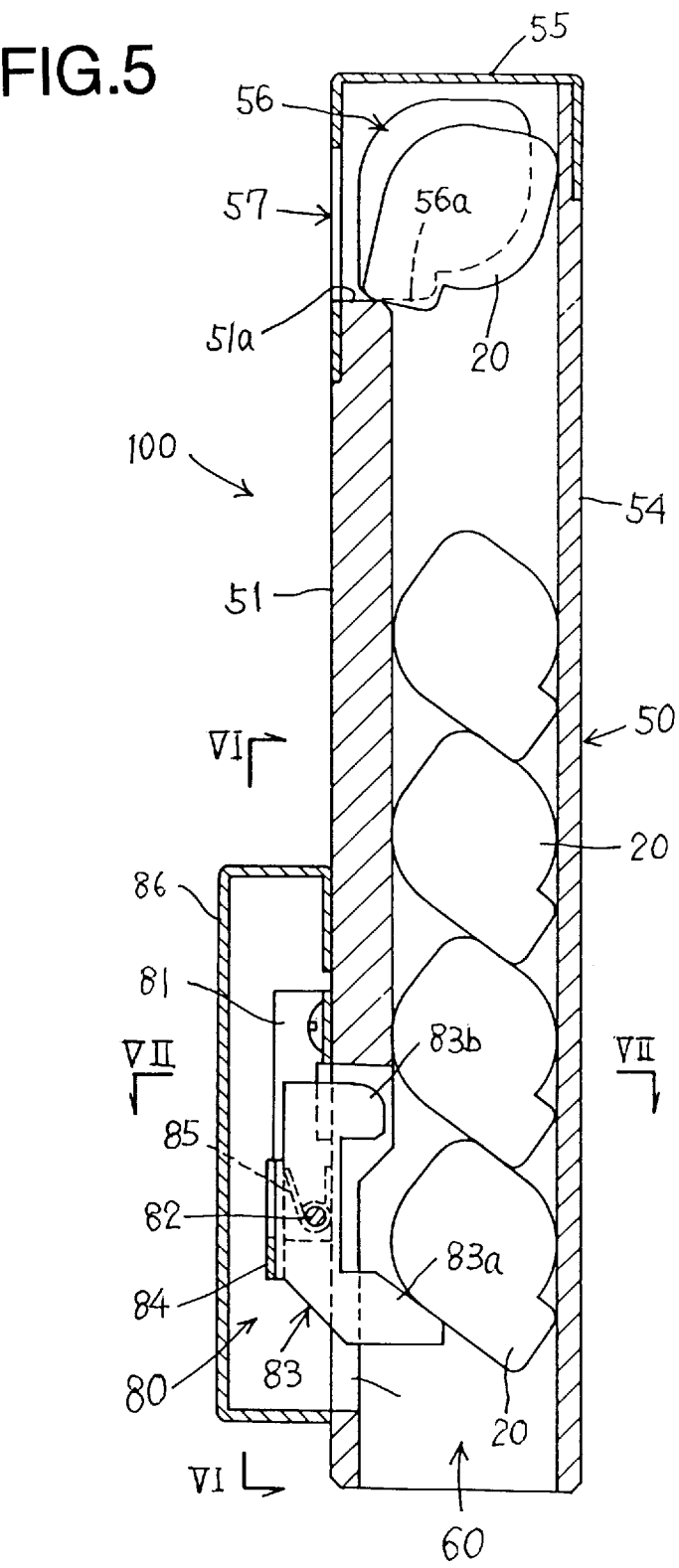
FIG. 5 is a section view of the film cartridge storage apparatus of FIG. 3.
Figure 6:
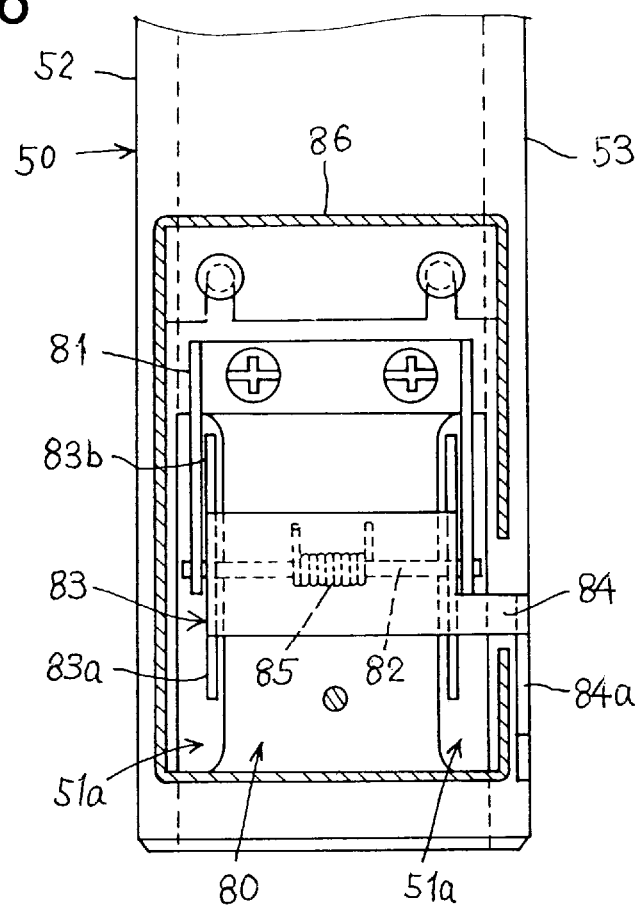
FIG. 6 is a section view taken along a line VI—VI in FIG. 5.

This film cartridge storage apparatus 100 is shown in its entirety in FIGS. 3, 4 and 5. As may be understood from these figures, the storage apparatus 100 includes a storage case 50 in which a plurality of film cartridges 20 are stacked one on another, an outlet section 60 detachably attached to a main body of the photographic printing system, and an individual feed mechanism 80 provided adjacent the outlet section 60.

The storage case 50, which has a rectangular cross section, comprises a base plate 51, a pair of side plates 52, 53, a front cover 54 and an upper cover 55 assembled together into a vertically elongate rectangular parallelepiped assembly having an open bottom constituting the outlet section 60.

The base plate 51 is formed shorter than the front cover 54 so as to leave an upper end face 51a of the base plate 51 exposed at an upper region of an inner space of the storage case 50.

Further, as shown in FIG. 4, in order to allow the film cartridges 20 to be stacked one on another in a lateral posture under which a film outlet opening 20a of the cartridge 20 is oriented obliquely downwards, a distance between the opposed side plates 52, 53 is set to substantially equal to the longitudinal length of the film cartridge 20 and also a distance between the base plate 51 and the front cover 54 is set to substantially equal to the minimum width of the cartridge 20 as viewed in an axial direction of a film winder shaft 20b thereof. With these arrangements, when the film cartridge 20 is inserted into the apparatus with downwardly orienting the film outlet opening 20a thereof, the cartridge 20 is allowed to drop under a predetermined storage posture with the film outlet opening 20a being oriented obliquely downwards or downwards as shown in FIG. 4.

On the other hand, at an area above the outlet section 60, the base plate 51 has a reduced thickness so as to provide an increased distance between the base plate 51 and the front cover 54 for allowing passage of the film cartridge 20 with its film outlet opening 20a oriented horizontally, so that the individual feed mechanism 80 changes the posture of the film cartridge 20 so as to orient its film outlet opening 20a horizontally at the down side as will be detailed later.

As may be understood from FIG. 3, the side plate 52 defines, adjacent its upper end, a cartridge inserting through hole 56 having a shape substantially corresponding to the shape of the cartridge 20 as viewed in the axial direction of the film winder shaft 20b and adapted for allowing passage of the cartridge 20 under the posture with the film outlet opening 20a being oriented downwards.

This cartridge inserting through hole 56 is formed slightly upwardly of the position where the upper end face 51a of the base plate 51 is exposed, and also a recess 56a of the hole 56 corresponding to the film outlet opening 20a of the film cartridge 20 is located level with the upper end face 51a of the base plate 51 as viewed sideways.

With the above-described construction, when the film cartridge is registered with this cartridge inserting through hole 56 and then is inserted therethrough into the upper region of the cylindrical inner space, the film outlet opening 20a of the film cartridge 20 is received on the upper end face 51a of the base plate 51, thereby to prevent this film cartridge 20 from falling, in the inner space of the storage case 50, under a vertical posture, i.e. under the posture with the longitudinal side of the cartridge being oriented perpendicularly. Hence, this upper end face 51a functions as a guide portion for guiding the film cartridge 20 during its insertion.

Further, as shown in FIG. 5, on the same level as the cartridge inserting through hole 56, the upper cover 55 defines a press hole 57. Then, by pushing, with e.g. a finger, through this press hole 57 the film cartridge 20 received and supported on the upper end face 51a of the base plate 51, the film cartridge 20 is now allowed to drop.

In the vicinity of the outlet section 60 of the base plate 51, there is provided the individual feed mechanism 80 shown in FIGS. 5, 6, 7 and 8. This individual feed mechanism 80 includes a pivotal member 83, a connector plate 84 connected together with the pivotal member 83, a pivot shaft 82 of the pivotal member 83, a shaft support plate 81 for pivotally supporting the pivotal shaft 82, a coil spring 85 fitted on the pivotal shaft 82 for biasing the pivotal member 83 and the connector plate 84 counter-clockwise in FIG. 5, and a cover 86 covering these components.

Figure 7:
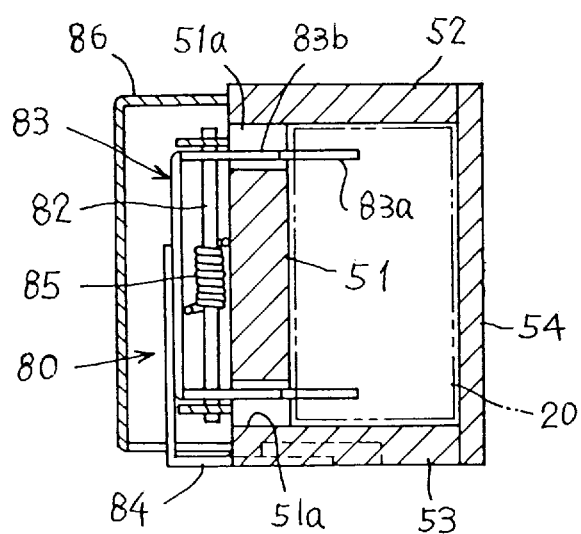
FIG. 7 is a section view taken along a line VII—VII in FIG. 5.
Figure 8:
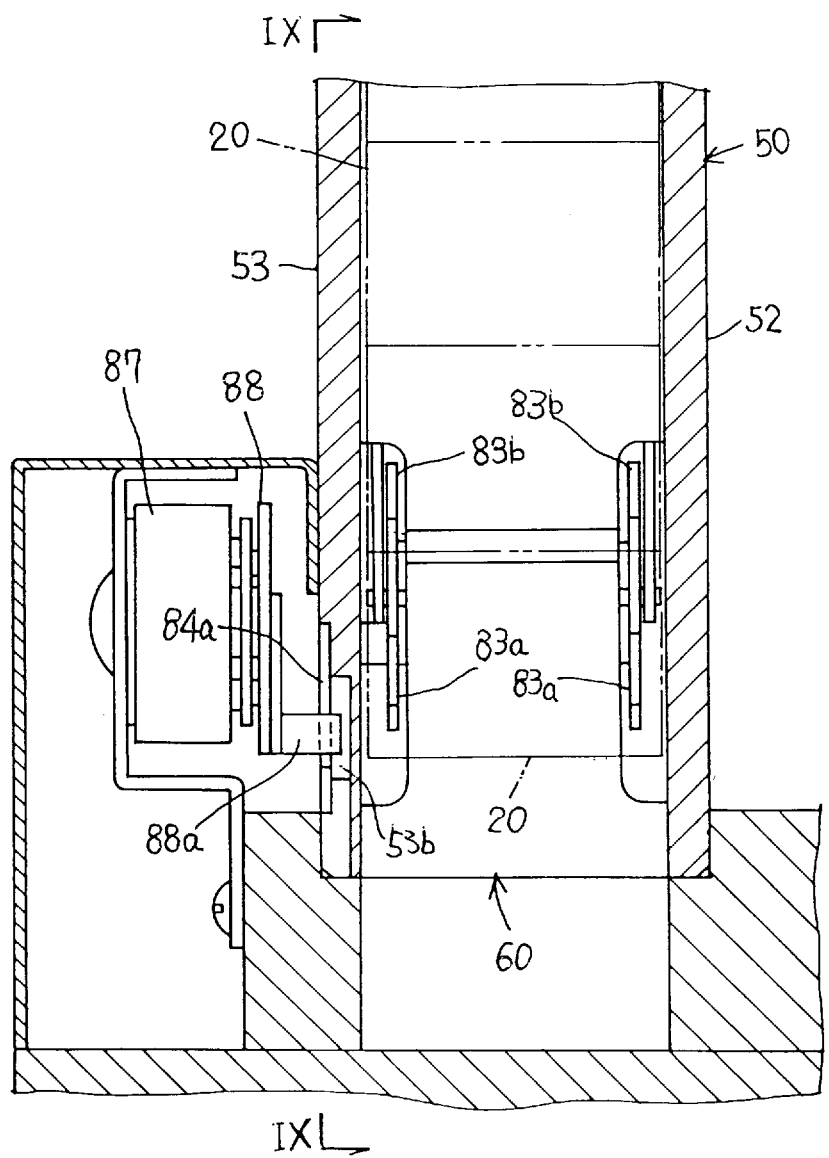
FIG. 8 is a section view of an individual feed mechanism.

Further, as shown in FIG. 5, the pivotal member 83 includes, as a pair provided on each of right and left sides thereof, a second arm portion 83b for preventing drop of the film cartridge 20, and a first arm portion 83a for receiving the film cartridge 20 and directing this film cartridge 20 into a predetermined posture. Thus, the entire pivotal member 83 presents a substantially C-shaped configuration in a plan view as shown in FIG. 7. The base plate 51 defines a pair of through grooves 51a for allowing the first arm portion 83a and the second arm portion 83b to be pivoted together to allow the film cartridge 20 to enter the cartridge passage space.

Figure 9A:
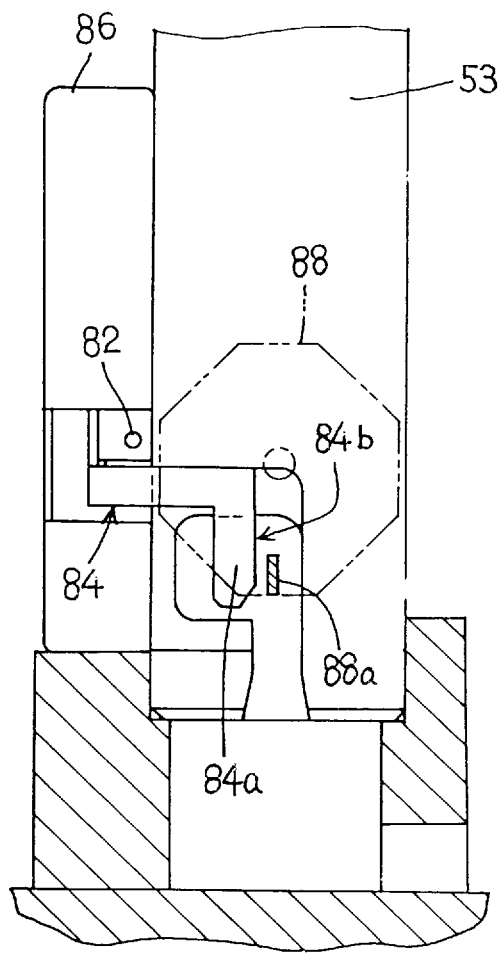
FIGS. 9A and 9B are section views taken along a line IX—IX of FIG. 8 illustrating functions of the individual feed mechanism of FIG. 8, FIGS. 10A and 10B are descriptive views illustrating the functions of the individual feed mechanism.
Figure 9B:
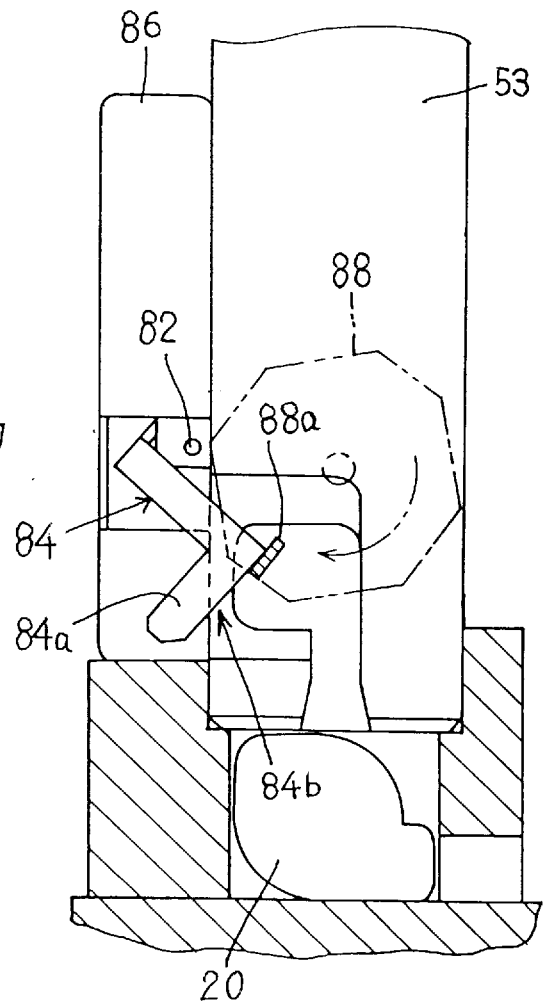

As shown in FIGS. 9A and 9B, the connector plate 84 has a substantially L-shaped configuration in a side view, and an upper end portion of the plate 84 is bent to extend toward and fixed to the pivotal member 83. An L-shaped portion 84a of the connector plate 84 is pivotable along the side plate 53, so this side plate 53, as shown in FIG. 4, defines a cutout portion 53a having an approximately rectangular shape in a side view, with an outer face of the L-shaped portion 84a being disposed in flush with the surface of the side plate 53. Further, an upper end face of the cutout portion 53a comes into contact with the L-shaped portion 84a biased by a coil spring 85, thus limiting the pivotal range of the pivotal member 83.

A rotary solenoid 87 for drivably pivoting the connector plate 84 is disposed in the main body of the photographic printing system 1. A pawl 88a of a rotary plate 88 mounted on a rotary shaft of the rotary solenoid 87 is placed in contact with a pawl guide face 85b of the L-shaped portion 88a of the connector plate 84 on the opposite side to the side connected with the pivotal member 83 (see FIGS. 9A, 9B). Then, in association with rotation of the rotary solenoid 87, the connector plate 84 and the pivotal member 83 are driven to pivot clockwise in FIGS. 9A and 9B.

Incidentally, this film cartridge storage apparatus 100 is detachably attachable to the main body of the photographic printing system 1. At the cutout portion 53a of the side plate 53, there is defined a deeper groove-like cutout portion 53b for allowing passage of the pawl 88a of the rotary plate 88 during attachment or detachment of the apparatus and allowing also a pivotal movement of the pawl 88a during a pivotal operation of the pivot member 83 (see FIG. 8).

Next, functions of the film cartridge storage apparatus 100 having the above-described construction will be briefly explained.

As shown in FIG. 5, when a film cartridge 20 is introduced through the cartridge inserting through hole 56, the film outlet opening 20a of this cartridge 20 comes into contact with the upper end face 51a of the base plate 51 and is received on this face under the predetermined posture. In this condition, when the film cartridge 20 is pushed from the press hole 57, the film cartridge 20 is allowed to fall into the storage case 50. Now, if the storage case 50 stores therein another film cartridge 20 introduced previously, the newly introduced film cartridge 20 will contact the preceding cartridge and come to a stop here. On the other hand, if the newly inserted cartridge is the first film cartridge, this cartridge will be received by the first arm portion 83a of the pivotal member 83 located in the first pivotal area and come to a stop at this position.

Figure 10A:
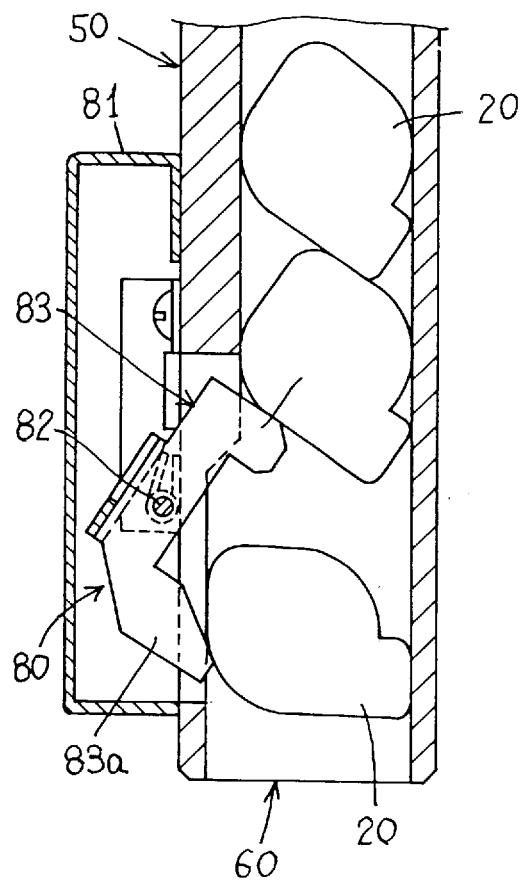
Figure 10B:
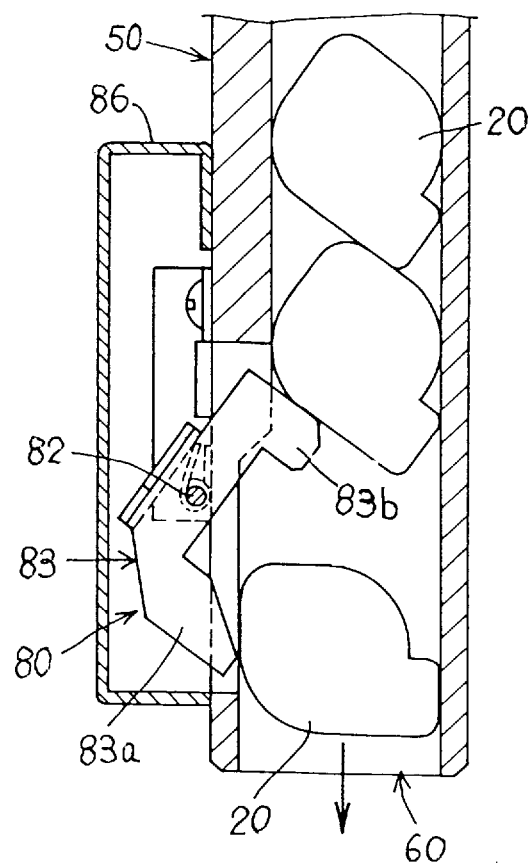

For individually extracting the film cartridges 20 stored within the film cartridge storage apparatus 100, the rotary solenoid 20 is energized to pivot the connector plate 84 clockwise in FIG. 9A against the biasing force of the coil spring 29. With this, the pivotal member 83 is pivoted to the second pivotal area, and as shown in FIGS. 10A, 10B, the first arm portion 83b projecting heretofore into the cartridge passage space is moved away from this space and instead the second arm portion 83b is moved into this cartridge passage space. Whereby, the lower film cartridge 20 having been received by the first arm portion 83a is now allowed to fall and the upper film cartridge 20 is received by the second arm portion 83b and prevented from falling further.

Figure 11A:
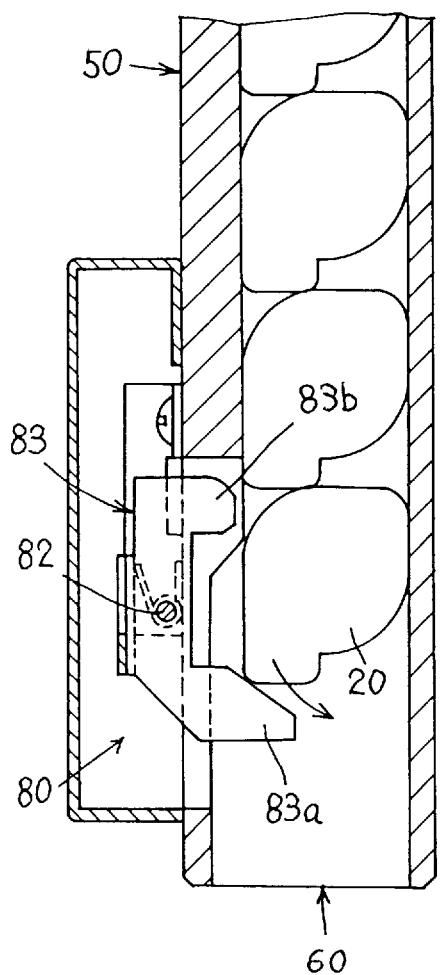
FIGS. 11A and 11B are descriptive views illustrating the functions of the individual feed mechanism.
Figure 11B:
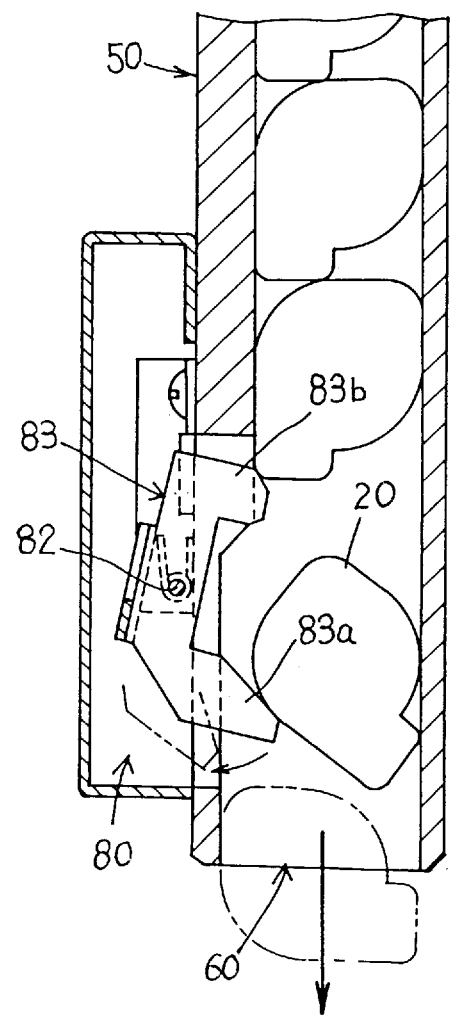

Within the storage case 50, the film cartridge 20 having been received by the first arm portion 83a is restricted to the posture shown in FIGS. 10A, 10B or to the posture shown in FIGS. 11A, 11B. Therefore, supposing the film cartridge 20 is now under the posture where the film outlet opening 100 is oriented obliquely downwards, this film cartridge 20 is received, as being maintained under this posture, by the first arm portion 83a. On the other hand, supposing the film cartridge 20 is under the further posture where the film outlet opening 100 is oriented straight downwards, this posture will be changed as the cartridge 20 comes into contact with the first arm portion 83a and slides on this first arm portion 83a. So, in this case too, the film cartridge 20 will eventually be received under the posture of FIG. 5. That is to say, regardless of the posture of the film cartridge at the time of its insertion into the apparatus, the film cartridge will eventually be received by the first arm portion 83a under the posture shown in FIG. 5. Then, when the first arm portion 83a is retracted, due to the balance of weight of the cartridge, the film cartridge 20 rotates to change its posture from the transitional posture 5 described above to the predetermined posture shown in FIGS. 11A, 11B in which the film outlet opening 100 is oriented horizontally and the film cartridge 20 is allowed to fall with this predetermined posture after the rotation being restricted or maintained by the inner wall of the outlet section 60.

The film cartridge 20 is supplied from the film cartridge storage apparatus 100 in the above-described manner and then its film 2 extracted from the cartridge is transported to the projection exposure unit 10. Then, in this projection exposure unit 10, if the unit 10 is now under the condition where the reflecting mirror 16 is located in the exposure light path, image information of the film 2 is scanned by the CCD image sensor 18. Alternatively, if the unit 10 is now under the other condition where the printing lens 13 is located on the exposure light path, the image information of the film 2 is now ready to be exposed on to the print paper 3.

FIGS. 12A, 12B, 12C and FIG. 13 show a modified construction of the individual feed mechanism for feeding film cartridges 20 one by one from the film cartridge storage apparatus 100.

In this individual feed mechanism 180, the first arm portion 183a and the second arm portion 183b of the pivotal member 183 for receiving the film cartridge 20 fallen within the storage case 50 are provided as two separate elements which are supported to the outer face of the front cover 54 to be pivotable about the pivot shaft 182.

Figure 13:
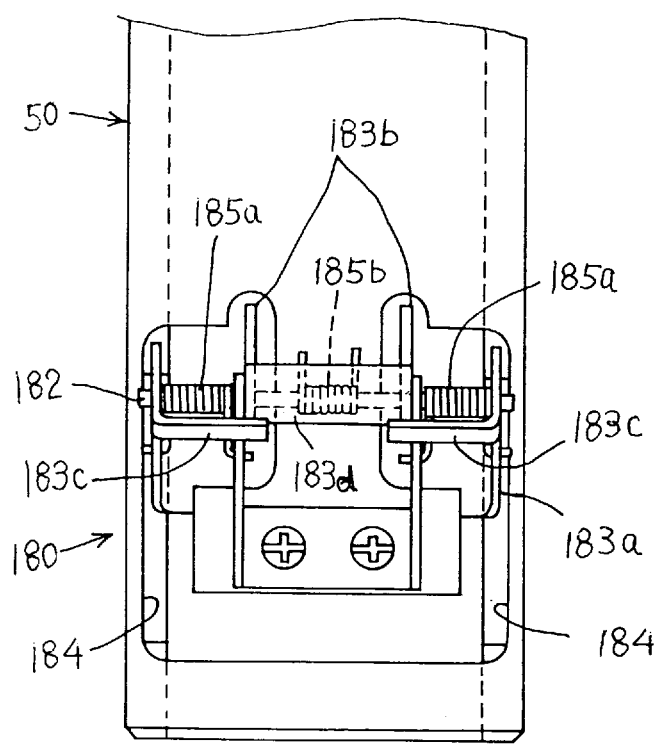
FIG. 13 is a section view of the individual feed mechanism of FIG. 12.

The first arm portion 183a and the second arm portion 183b are biased counterclockwise in FIGS. 12A, 12B and 12C about a pivotal shaft 182 by means of coil springs 185a, 185b respectively (see FIG. 13). The first arm portion 183a and the second arm portion 183b are operatively coupled with each other as a base end corner portion 183d of the second arm portion 183b comes into contact with a base end support portion 183c of the first arm portion 183a.

The first arm portion 183a includes a bottom plate portion 183e supported by a pair of side plate portions 183c. The bottom plate portion 183e receives a falling film cartridge 20. Along the pivotal range of the side plate portions 183c, the side plates 52, 53 define, in inner faces thereof, fan-shaped recesses 184, so that the side plate portions 183c may project into the film cartridge passage space to prevent further falling of the film cartridge 20. Further, an upper end inclined face of the fan-shaped recess 184 is placed in contact with the side plate portion 183c, thus limiting the pivotal range of the first arm portion 183a.

The bottom plate portion 183e of the first arm portion 183a receives the film cartridge 20 fallen within the storage case 50 under a posture depicted in FIG. 12A. In this condition, when the first arm portion 183a is driven, by means of an unillustrated actuator such as a rotary solenoid, to be pivoted clockwise away from the cartridge passage space as illustrated in FIGS. 12B and 12C, the film outlet opening 20a of the film cartridge 20 comes into contact with the front cover 54 and the film cartridge 20 is allowed to fall under a predetermined posture shown in FIG. 12C with the film outlet opening 20a being oriented horizontally. Simultaneously, as being pushed by the base end support portion 40a of the first arm portion 183a, the second arm portion 183b projects into the inner space of the storage case 50 so as to prevent further falling of the film cartridge 20 which is located immediately upwardly of the film cartridge which is allowed to fall. In this manner, the film cartridges 20 are allowed to fall one after another.

FIGS. 14 through 17A, 17B, 17C show a further embodiment of the film cartridge storage apparatus of the invention. In the following description, substantially identical components as those in the foregoing embodiments will be denoted with the same reference marks and numerals and unnecessary repetition of the description will be avoided.

Figure 14:
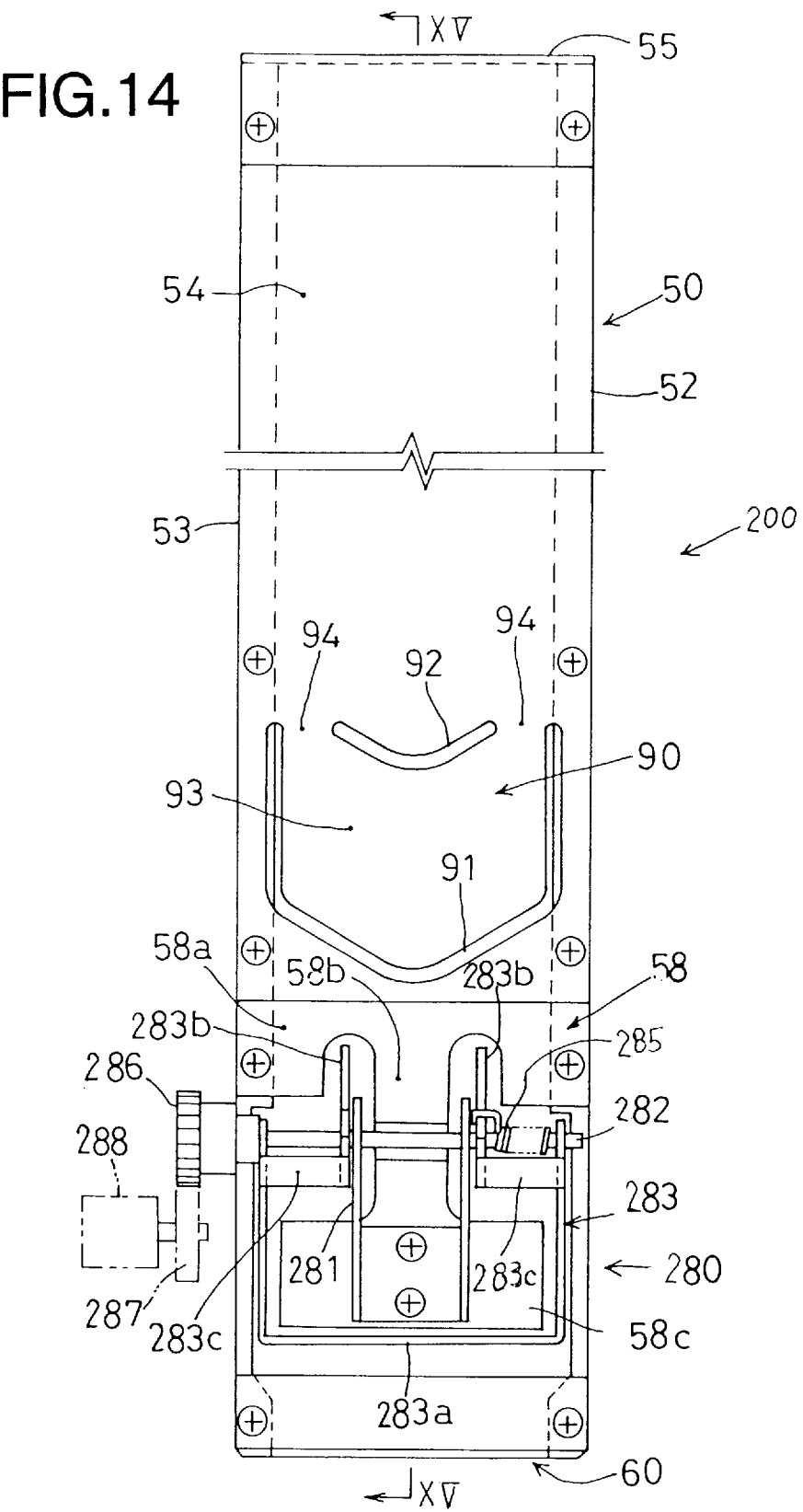
FIG. 14 is a front view showing a film cartridge storage apparatus according to a further embodiment of the present invention.
Figure 15:
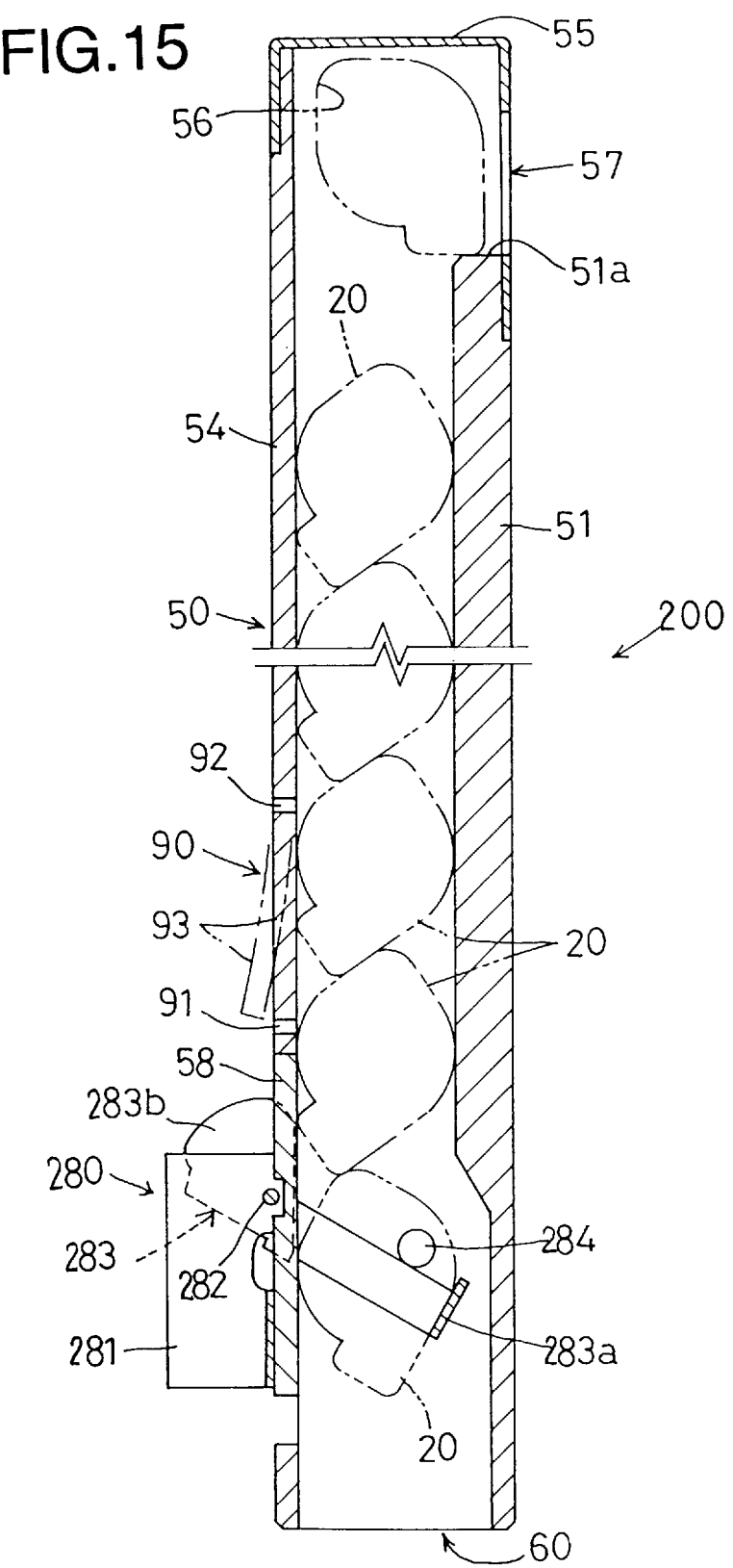
FIG. 15 is a section view taken along a line XV—XV of FIG. 14.
Figure 16:
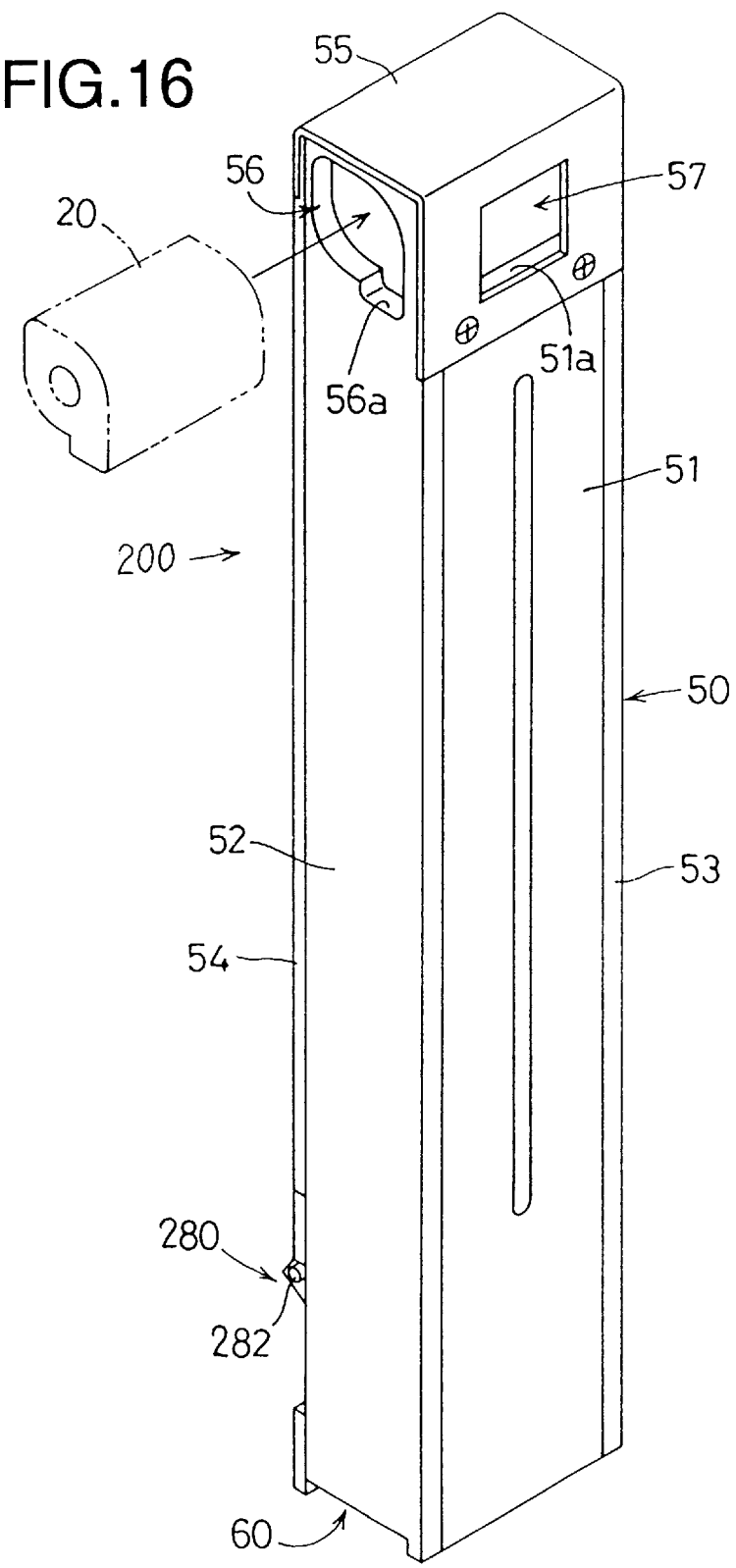
FIG. 16 is a perspective view of the film cartridge storage apparatus of FIG. 14, FIGS. 17A, 17B and 17C are descriptive views illustrating functions of an individual feed mechanism used in the apparatus of FIG. 14.
Figure 17:
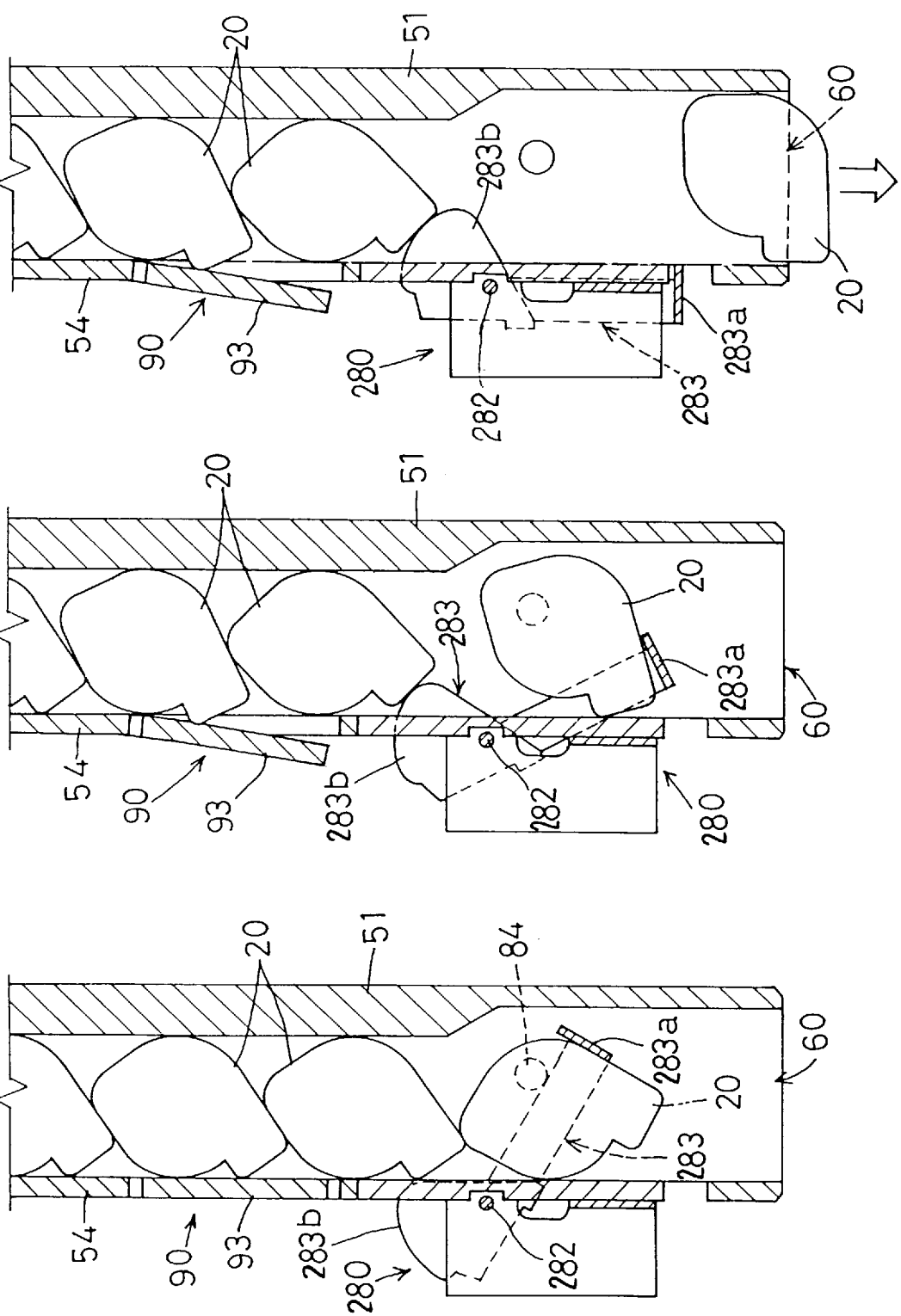

In a film cartridge storage apparatus 200 according to this embodiment, as shown in FIG. 14, the front cover 54 includes a cartridge escape mechanism 90 as an embodiment of the elastic escape means 90 disposed immediately upwardly of the individual feed mechanism 280. This cartridge escape mechanism 90 comprises a tongue element 93 defined by a U-shaped slit 91 cut in the front cover 54 and a transverse slit 92 cut in the cover 54 with maintaining slight distances 94 from respective upper ends of the U-shaped slit 91. Then, as the distances 94, i.e. the un-cut joining portions with the front cover 54 act as a 'hinge', the tongue element 83 is elastically flexed when subjected to a force from the stacked film cartridges 20. For providing this function and also for allowing visual confirmation of the film cartridges stacked inside, the front cover 54 is formed preferably of a transparent synthetic resin material.

Figure 18:
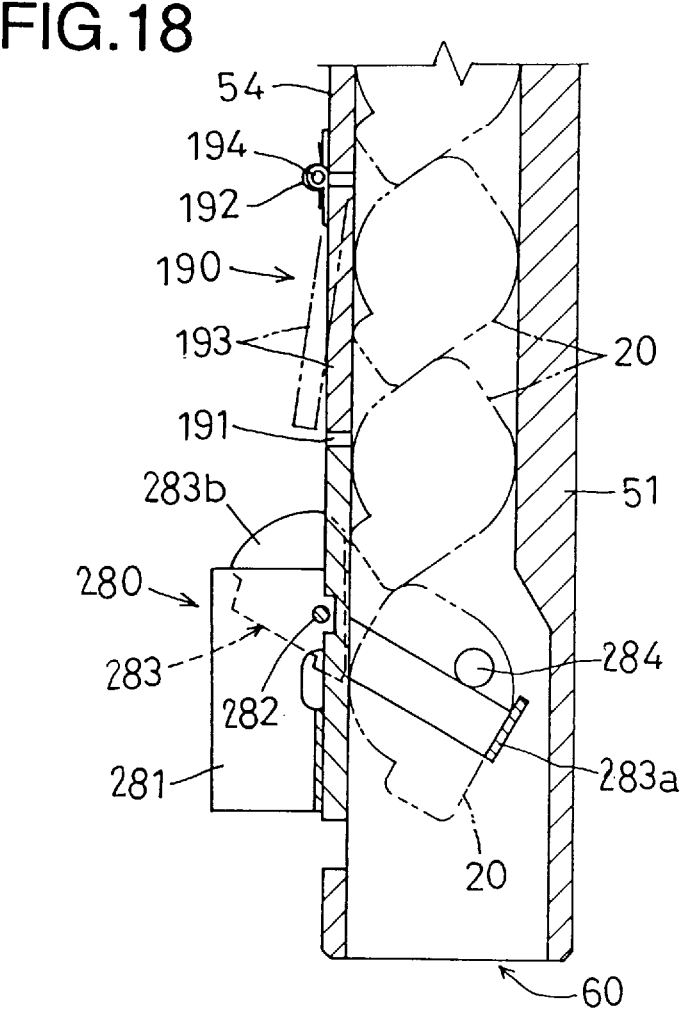
FIG. 18 is a schematic view of a modified cartridge escape mechanism.

A modified construction of the cartridge escape mechanism 190 is shown in FIG. 18. In this case, the front cover 54 defines a complete opening 191 and a pivotal lid 193 is provided for closing this opening 191. Numeral 194 denotes a hinge element which allows the pivotal lid to pivot only to the outside. Numeral 192 denotes a spring biased to normally prevent a pivotal movement of the pivotal lid 193. Then, the pivotal lid 193 is pivoted to the outside when subjected to a force from the film cartridge overwhelming the biasing force of the spring 192.

Referring back to FIG. 14, a lower portion of the front cover 54 is formed separately of a support plate 58 for supporting the the individual feed mechanism 280. This support plate 58 has a T-like or horizontally turned-over H-like configuration and consists essentially of laterally extending upper and lower side portions 58a, 58c and a vertically extending vertical side portion 58b joining central portions the upper side portion 58a and the lower side portion 58c to each other. The upper side portion 58a is bolt-secured to side end faces of the respective side plates 52, 53. The lower side portion 58c extends downwardly from the upper side portion 58a via the vertical side portion 58b. With this construction, on the opposed sides defined by the vertical side portion 58b and the lower side portion 58c and also downwardly of the lower side portion 58c, there are formed openings communicated with the inner storage space for the film cartridges 20.

The individual feed mechanism 280 includes a bracket 281 bolt-secured to the lower side portion 58c of the support plate 58, a pivotal shaft 282 rotatably supported to the bracket 281, and a pivotal member 283 secured to the pivotal shaft 282. The pivotal member 283 includes a first arm portion 283a comprised of a plate element bent at two positions into a C-like cross-sectional configuration and a second arm portion 283b comprised of a pair of fan-shaped plates. The first arm portion 283a is secured, at free ends of the C-shaped configuration, to the pivotal shaft 282. And, the second arm portions 283b are secured, at the centers of the fan-shaped configuration, to the pivotal shaft 282. Further, the fan-shaped plates constituting the second arm portions 283b and fixed sides of the first arm portion 283a are connected to each other via connecting plates 283c. Then, the first arm portion 283a and the second arm portions 283b are substantially opposed to each other relative to the pivotal shaft 282. Then, when the first arm portion 283a is pivoted into the passage of the film cartridges 20 by utilizing the gaps formed between the lower side portion 58c and the side plates, the second arm portions 283b are pivoted out of the storage case by utilizing the gaps formed by the vertical side portion 58b and the side plates.

The pivotal range of the pivotal member 283 is defined by a first area where the first arm portion 283a holds, at a horizontal plate portion thereof formed at the center of its C-shaped configuration, the film cartridge falling from the above (this posture of the pivotal member depicted in FIG. 17A) and a second area where the horizontal plate portion moves away from the film cartridge to feed it to the outlet section 60 (this posture of the pivotal member depicted in FIG. 17C). In the first area, the second arm portions 283b allow a film cartridge to be dropped on to the first arm portion (FIG. 17A); and in the second area, the second arm portions 283b prevent the film cartridge from falling on to the first arm portion (FIG. 17C).

Figure 19:
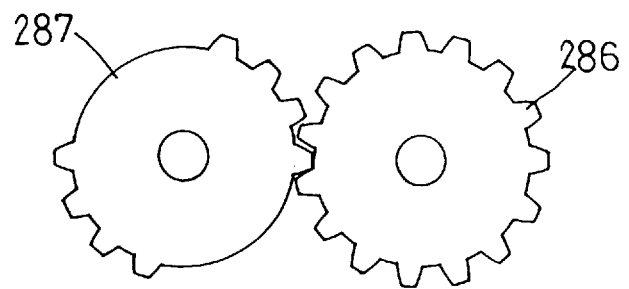
FIG. 19 is a schematic view of a gear transmission mechanism.

The pivotal movement of the pivotal member 283 is effected by means of rotation of the pivotal shaft 283. In this respect, the pivotal shaft 282 is coupled with a drive motor 288 via a gear transmission mechanism 286, 287. In the instant embodiment, a driven gear 286 comprises a common flat gear. Whereas, as shown in FIG. 19, a drive gear 287 comprises a special gear including operative regions having meshing teeth and inoperative regions having no meshing teeth, with these operative regions and inoperative regions being alternately provided at respective 90 degree phases of the gear periphery. Then, the pivotal movement of the pivotal member 283 from the first area to the second area is effected by utilizing the operative region, i.e. utilizing meshing between the drive gear 287 and the driven gear 286 by means of the drive motor 287. Whereas, the reverse pivotal movement of the pivotal member 283 from the second area to the first area is effected by utilizing the inoperative region, i.e. by reverse rotation of the pivotal shaft 282 due to a biasing force of a spring 285 after the pivotal shaft 282 is disconnected from the drive motor 287 through release of the meshing between the drive gear 287 and the driven gear 286. For this purpose, the spring 285 comprise a coil spring fitted on the pivotal shaft 282 and having one end thereof connected to the bracket 281 and the other end thereof connected to the pivotal member 283. Further, the drive motor 283 is provided with a rotation detecting sensor 289, so that based on a detection signal from this sensor the control 4 controls rotation and stop of the drive motor 287.

Numeral 284 denotes an end stopper for the first area of the first arm portion and this stopper includes a disc portion contacting the first arm portion and an arm portion supporting the disc portion.

Further, this film cartridge storage apparatus 200 is detachably attachable to the main body of the photographic printing system 1 and includes, downwardly of the outlet section 60, a transport device for transporting the individually fed film cartridge to a film withdrawing device.

Next, the individual feeding operation of the film cartridge storage apparatus 200 having the above-described construction will be briefly described with reference to FIGS. 17A, 17B and 17C.

When a film cartridge 20 is introduced through the cartridge inserting through hole 56, the film outlet opening 20a of the film cartridge 20 comes into contact with and is received by the upper end face of the base plate 51.

In this condition, when the film cartridge 20 is pushed from the press hole 57, the film cartridge 20 is caused to fall inside the storage case 50 with the cartridge 20 being maintained under the posture assumed when the cartridge 20 was introduced. Then, if there exists another film cartridge 20 previously stored, the newly introduced film cartridge will fall into contact with this previously stored film cartridge 20 and then stops here. Whereas, if the newly introduced film cartridge is the first film cartridge introduced into the apparatus, the falling cartridge will come into contact with the first arm portion 283a, more specifically, the lower side of this first arm portion 283, of the pivotal member 283 which has been pivoted to the first pivotal area.

For individually feeding the film cartridges 20 stored within the storage case 50, the rotary force of the drive motor 288 is transmitted through the inter-meshing between the respective teeth of the gears 287, 286 to the pivotal shaft 282, thereby to pivot, against the biasing force of the spring 285, the pivotal member 283 now located in the first area shown in FIG. 17A in the direction in which the first arm portion 283a is oriented vertically (FIG. 17B). With this pivotal movement of the pivotal member 283 to the second area, the first arm portion 283a which was projecting into the inner space of the storage case 50 is now retracted therefrom and instead the second arm portions 283b are introduced into the inner space of the storage case 50 (FIG. 17C). With this, the lowermost film cartridge 20 which has been received by the first arm portion 283a is now allowed to drop into the outlet section 60, and the further film cartridge 20 located immediately above the lowermost cartridge will have its bottom end 'scooped up' and supported by the fan-shaped peripheral portions of the second arm portions 283b, whereby this cartridge is prevented from falling any further.

Now, when the second arm portions 283b scoop up the bottom end of the film cartridge 20, if a number of film cartridges 20 are stacked thereon, there is possibility that these film cartridges become jammed and stuck to each other thereby to disable the second arm portions 283b from being pivoted. The, when such jamming occurs, as illustrated in FIGS. 17B, 17C, the tongue piece 93 of the cartridge escape mechanism 90 described hereinbefore is elastically flexed to the outside thereby to make some room of movement for the film cartridges 20, so that the second arm portions 283b may smoothly project into the inner space of the storage case 50.

Then, when the rotation proceeds to reach the area where the gear 266 faces the toothless, i.e. inoperative region of the gear 287, the meshing between the gear 287 and the gear 286 is released, upon which the pivotal member 283 is quickly returned from the second area to the first area by the biasing force of the spring 285 (FIG. 17A). In the course of this, as the second arm portions 53b are retracted, the film cartridge 20 is allowed to fall until being received by the first arm portion 283a which has again projected into the inner space of the storage case 59.

The lowermost film cartridge 20 having fallen with the pivotal movement of the pivotal member 283 to the second area is then transported by the unillustrated transporting device to the film withdrawing device for withdrawing the film from the outlet opening 20a of the film cartridge 20. Then, when the extracted film 2 reaches the projection exposure unit 10, in this projection exposure unit, if the reflecting mirror 16 is now located on the exposure light path, image information of the film 2 is scanned by the CCD image sensor 19. Whereas, if the printing lens 14 is located on the exposure light path, the image information of the film 2 is exposed on to the print paper 3.

In the above embodiment, the elastic escape means is embodied as the film cartridge escape mechanism 90. Instead of allowing escape of the film cartridge, this elastic escape means may be embodied as an arm escape mechanism 290 for allowing escape of the pivotal member 283, more particularly, the second arm portions 283b. In this case, as shown in FIGS. 20A and 20B, a pair of right and left elongate slots 292 are defined in a bracket 291 supporting the pivotal shaft 282 of the pivotal member 283. Then, the pivotal shaft 282 is inserted into the elongate slots 292 so as to be slidable away from the inner space of the storage case. Further, the pivotal shaft 283 is biased toward the inner space by means of a spring 293. In operation, when jamming occurs between the second arm portions 293b and a film cartridge 20, the pivotal shaft 282 slides away to the outside, thus allowing the second arm portions 283b to move away from the film cartridge 20. As a result, the second arm portions 283b can smoothly effect the pivotal movement for scooping up the film cartridge 20. In the case of this construction, the pivotal shaft 282 needs to be moved, i.e. slid. Hence, as the transmission mechanism between the pivotal shaft 282 and the drive motor 288, instead of the gears, there will be employed teethed pulleys 294, 295 about which there is entrained a timing belt 296 which may be tension-adjusted by a belt tensioner when necessary or appropriate. Then, by providing the timing belt with an operative region having meshing teeth or and an inoperative region having no such teeth, this modified mechanism can provide the same function as that provided by the gear transmission mechanism described hereinbefore.

Another simple embodiment of the arm escape mechanism 290 is realized by rendering the vertical side portion 58b of the support plate 58 described hereinbefore elastically deformable by e.g. reducing the width of the vertical side 58b. In this case too, the transmission mechanism between the pivotal shaft 282 and the drive motor 288 will comprise not the gear type mechanism but the belt type mechanism.

Further, in the foregoing embodiments, the film cartridge 20 to be stored is the type having the contour shown in FIG. 2. The apparatus may be used for storing other types of film cartridge 20 having different contours as long as such contour is non-round, i.e. has differing diameters in the axial direction of the film winder shaft. Namely, the apparatus of the invention may be used for all types of film cartridges conformed with the international standards (ISO, JIS and so on). And, modifications of the apparatus for such cartridges too are included within the scope of the present invention.

Also, in the foregoing embodiments, the film cartridge storage apparatus is attached to the photographic printing system. Instead, the apparatus of the invention may be used independently or in combination with any other type of photographic processing system such as a film processor, a film splicer or the like. Moreover, the apparatus may be modified to store the cartridges stacked along an oblique line or along a curved line in a row, instead of the straight vertical line. In this manner, the specific stacking arrangement of the film cartridges may vary depending on the convenience.

Still further, the storage posture of the film cartridge is not limited to the one shown in the embodiment. Instead, the cartridge may be stored with being rotated up or down, or to the right or the left.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film cartridge storage apparatus for storing a plurality of film cartridges and feeding the cartridges individually, which comprises:

a storage case for stacking the plurality of film cartridges in a row;

an inlet section including an inlet opening configured to introduce the film cartridges while maintaining each cartridge in a predetermined posture;

an outlet section provided at a lower portion of the storage case for exiting the film cartridges stored within the cartridge case while maintaining the cartridge in a predetermined posture;

an individual feed mechanism disposed adjacent the outlet section, wherein said individual feed mechanism includes a movable member movable between a first area and a second area, said movable member including a first arm portion and a second arm portion, said first arm portion being adapted to hold a lowermost film cartridge at the first area and also to release and feed the lowermost film cartridge at the second area, said second arm portion being adapted to allow a film cartridge to be dropped toward the first arm portion at the first area and also to prevent the film cartridge from being dropped toward the first arm portion at the second area; and a cartridge escape mechanism which is formed at least at a portion of a wall member constituting the storage case and which is capable of being elastically deformed to the outside, whereby the cartridge escape mechanism allows the film cartridge contacting the second arm portion to move out of a pivotal locus of the second arm portion when the second arm portion moves from the first area to the second area.

2. A film cartridge storage apparatus as claimed in claim 1, wherein said inlet section includes a guide portion for temporarily holding the film cartridge introduced from the inlet opening.

3. A film cartridge storage apparatus as claimed in claim 2, wherein the film cartridge held by said guide portion is accessible to be released from the guide portion to be introduced into said storage case.

4. A film cartridge storage apparatus as claimed in claim 3, wherein the film cartridge held by said guide portion is accessible from the outside through an opening to be introduced into said storage case.

5. A film cartridge storage apparatus as claimed in claim 1, wherein said storage case has a substantially square cross section, one side of the square corresponding in length to an axial length of the film cartridge contour, the adjacent side of the square corresponding in length to a minimum radial length of the film cartridge contour.

6. A film cartridge storage apparatus as claimed in claim 5, wherein within a movable range of said individual feed mechanism, a film passage has an enlarged cross section in the radial direction of the film cartridge relative to a cross section of said storage case.

7. A film cartridge storage apparatus as claimed in claim 1, wherein said movable member of the individual feed mechanism comprises a pivotal member pivotable between said first area and said second area.

8. A film cartridge storage apparatus as claimed in claim 7, further comprising an elastic escape means for preventing mutual interference between a film cartridge contacting said second arm portion and a pivotal locus of said second arm portion.

9. A film cartridge storage apparatus as claimed in claim 8, wherein said elastic escape means comprises a cartridge escape mechanism for elastically moving the film cartridge contacting the second arm portion out of the pivotal locus of the second arm portion.

10. A film cartridge storage apparatus as claimed in claim 9, wherein said cartridge escape mechanism includes a deformable member which is formed at least at a portion of a wall member constituting the storage case and which is capable of being elastically deformed to the outside.

11. A film cartridge storage apparatus as claimed in claim 10, wherein said deformable member comprises a tongue element formed by cutting the wall member of the storage case with leaving proximal end of the element un-cut from the wall member.

12. A film cartridge storage apparatus as claimed in claim 10, wherein said deformable member comprises a pivotal lid spring-biased so as to close an opening defined in the wall member of the storage case.

13. A film cartridge storage apparatus as claimed in claim 8, wherein said elastic escape means comprises an arm escape mechanism for allowing the second arm portion to be moved in a direction away from the film cartridge contacting this second arm portion.

14. A film cartridge storage apparatus as claimed in claim 13, wherein said arm escape mechanism includes a flange for pivotably connecting a pivotal shaft of said pivotal member to said storage case via a spring.

15. A film cartridge storage apparatus as claimed in claim 7, wherein said pivotal member is coupled with a drive motor through a gear transmission mechanism including a drive gear and a driven gear, either of said drive gear and said driven gear having an operative region and an inoperative region provided in a regular distribution pattern, said pivotal movement of the pivotal member from the first area to the second area being effected by means of the drive motor whereas said return pivotal movement of the pivotal member from the second area to the first area being effected by means of a spring force by utilizing the inoperative region.

16. A film cartridge storage apparatus as claimed in claim 1, wherein said film cartridge to be stored within said storage case includes outer peripheral areas formed as two projections opposed to each each other as viewed from a direction of a film winding shaft thereof, such that with said projections the film cartridge is stored and maintained at the predetermined posture within said storage case.

17. A film cartridge storage apparatus for storing a plurality of film cartridges and feeding the cartridges individually, which comprises:

a storage case for stacking the plurality of film cartridges in a row;

an inlet section including an inlet opening configured to introduce the film cartridges while maintaining each cartridge in a predetermined posture;

an outlet section provided at a lower portion of the storage case for exiting the film cartridges stored within the cartridge case while maintaining the cartridge in a predetermined posture;

an individual feed mechanism disposed adjacent the outlet section, wherein said individual feed mechanism includes a pivotable member pivotable between a first area and a second area, said pivotable member including a first arm portion and a second arm portion, said first arm portion being adapted to hold a lowermost film cartridge at the first area and also to release and feed the lowermost film cartridge at the second area, said second arm portion being adapted to allow a film cartridge to be dropped toward the first arm portion at the first area and also to prevent the film cartridge from being dropped toward the first arm portion at the second area; and an escape mechanism for allowing the second arm portion to be moved thereby to prevent mutual interference between the second arm portion and any one of the film cartridges when the second arm portion moves from the film cartridge first arm portion area to the second area, wherein said escape mechanism includes a flange for pivotally connecting a pivotal shaft of the pivotal member to said storage case via a spring.

18. A film cartridge storage apparatus for storing a plurality of film cartridges and feeding the cartridges individually, which comprises:

a storage case for stacking the plurality of film cartridges in a row;

an inlet section including an inlet opening configured to introduce the film cartridges while maintaining each cartridge in a predetermined posture, the inlet section including a guide portion for temporarily holding the film cartridge introduced from the inlet opening, and an opening through which the film cartridge held by the guide portion is accessible to be released and introduced into the storage case;

an outlet section provided at a lower portion of the storage case for exiting the film cartridges stored within the cartridge case while maintaining the cartridge in a predetermined posture;

an individual feed mechanism disposed adjacent the outlet section, wherein said individual feed mechanism includes a movable member movable between a first area and a second area, said movable member including a first arm portion and a second arm portion, said first arm portion being adapted to hold a lowermost film cartridge at the first area and also to release and feed the lowermost film cartridge at the second area, said second arm portion being adapted to allow a film cartridge to be dropped toward the first arm portion at the first area and also to prevent the film cartridge from being dropped toward the first arm portion at the second area; and an escape mechanism for preventing mutual interference between the second arm portion and any one of the film cartridges when the second arm portion moves from the first area to the second area.

* * * * *

UNITED STATES PATENT AND TRADEMARK OFFICE
CERTIFICATE OF CORRECTION

PATENT NO. : 5,825,462
DATED : Oct. 20, 1998
INVENTOR(S) : Miyamori, et al.

It is certified that error appears in the above-identified patent and that said Letters Patent is hereby corrected as shown below:

In column 7, line 46, "88a" should read - - 84a - -.

Signed and Sealed this

First Day of August, 2000

Attest:

Attesting Officer

Q. TODD DICKINSON
Director of Patents and Trademarks